(12) United States Patent
Walker et al.

(10) Patent No.: US 10,563,770 B2
(45) Date of Patent: Feb. 18, 2020

(54) WASHPIPE ASSEMBLIES FOR A POWER SWIVEL

(71) Applicant: National Oilwell Varco, L.P., Houston, TX (US)

(72) Inventors: Christopher Brian Walker, Cypress, TX (US); Henry Do, Katy, TX (US); Robert Ioan Papp, Houston, TX (US); Mihail Puscas, Rosenberg, TX (US); Calvin Ronald Blankenship, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 261 days.

(21) Appl. No.: 15/586,509

(22) Filed: May 4, 2017

(65) Prior Publication Data

US 2017/0321807 A1   Nov. 9, 2017

Related U.S. Application Data

(60) Provisional application No. 62/332,208, filed on May 5, 2016.

(51) Int. Cl.
*F16J 15/3284* (2016.01)
*E21B 3/02* (2006.01)
*E21B 21/02* (2006.01)

(52) U.S. Cl.
CPC ............ *F16J 15/3284* (2013.01); *E21B 3/02* (2013.01); *E21B 21/02* (2013.01)

(58) Field of Classification Search
CPC .......... F16J 15/3284; G01M 3/02; E21B 3/02; E21B 21/02

USPC .............. 173/197; 166/77.1; 175/24; 285/16
See application file for complete search history.

(56) References Cited

U.S. PATENT DOCUMENTS

| | | | | |
|---|---|---|---|---|
| 2,764,428 A * | 9/1956 | Murphy | ................... | E21B 21/02 277/503 |
| 3,736,007 A * | 5/1973 | Heilhecker | ............. | E21B 21/02 277/322 |
| 3,752,507 A * | 8/1973 | Maurer | ................... | E21B 21/02 277/563 |
| 4,574,893 A * | 3/1986 | Young | ........................ | E21B 3/02 173/217 |
| 4,984,641 A * | 1/1991 | Pryor | ........................ | E21B 3/02 173/216 |
| 6,007,105 A * | 12/1999 | Dietle | ................. | F16L 27/0828 277/559 |
| 6,725,949 B2 * | 4/2004 | Seneviratne | ............ | E21B 21/02 175/113 |
| 8,002,048 B2 * | 8/2011 | Saehn | ........................ | E21B 7/02 173/152 |

(Continued)

*Primary Examiner* — Nathaniel C Chukwurah
(74) *Attorney, Agent, or Firm* — Conley Rose, P.C.

(57) ABSTRACT

A washpipe assembly for a power swivel and a power swivel incorporating the washpipe assembly. In an embodiment, the washpipe assembly includes a washpipe including a central axis and a radially outermost cylindrical surface. In addition, the washpipe assembly includes a first packing assembly configured to be coupled to a stem of the power swivel. The first packing assembly includes a seal assembly that includes one or more annular seal members each including a body and a contact insert mounted to the body, the contact insert engaging and forming a dynamic seal with the radially outermost cylindrical surface of the washpipe.

21 Claims, 10 Drawing Sheets

(56) References Cited

U.S. PATENT DOCUMENTS

| | | | | |
|---|---|---|---|---|
| 9,381,840 B2* | 7/2016 | Tobata | ............... | B60N 2/16 |
| 2004/0207159 A1* | 10/2004 | Morrow | ............... | E21B 17/05 |
| | | | | 277/510 |
| 2007/0251699 A1* | 11/2007 | Wells | ............... | E21B 19/16 |
| | | | | 166/377 |
| 2007/0251703 A1* | 11/2007 | Riley | ............... | E21B 21/02 |
| | | | | 166/380 |

* cited by examiner

WASHPIPE ASSEMBLIES FOR A POWER SWIVEL

CROSS-REFERENCE TO RELATED APPLICATIONS

The present application claims the benefit of U.S. Provisional Application No. 62/332,208, filed May 5, 2016, entitled "Washpipe Assemblies for a Power Swivel," which is incorporated by reference in its entirety for all purposes.

STATEMENT REGARDING FEDERALLY SPONSORED RESEARCH OR DEVELOPMENT

Not applicable.

BACKGROUND

This disclosure generally relates to drilling a subterranean well for the recovery of hydrocarbons. More particularly, this disclosure relates to power swivels for drilling a subterranean wellbore.

A power swivel is used to drive rotation of a tubular drill string and the drill bit attached to its end so as to form or extend a subterranean wellbore. The power swivel may be driven, in at least some examples, by a hydraulic motor that transfers torque through a gear box to the drill string and the attached drill bit. In addition, the power swivel may include a washpipe assembly that conducts fluid (e.g., drilling fluids) from a source and into the tubular string. While routing the fluid into the drill string, the washpipe provides a sealed connection between the rotating and non-rotating components of the power swivel during drilling operations.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, a power swivel may include a washpipe assembly that routes fluid (e.g., drilling fluids) from a source and into a tubular string during drilling operations. In some situations, the washpipe assembly (particularly the seals disposed within the washpipe assembly) can limit the maximum allowable pressure of the drilling fluid (or other fluids) that the power swivel delivers to the tubular string (i.e., the maximum allowable pressure within the power swivel in general may be limited by the maximum allowable pressures that may be contained by the washpipe assembly). In addition, because the washpipe is disposed at the junction of rotating and stationary components within the power swivel, the components of the washpipe assembly are exposed to an increased amount of wear during operation of the power swivel. As the drilling and production conditions become more challenging, there will be an increased need for higher pressure drilling fluids and higher torque to the drill string and drill bit to effectively and safely drill a subterranean wellbore for oil and gas exploration and production. Accordingly, there is a need for a washpipe assembly on a power swivel that can withstand a high internal pressures and higher torque to facilitate these more challenging drilling operations. Therefore, embodiments disclosed herein include washpipe assemblies, and power swivels incorporating the same, that are configured to withstand these more challenging conditions.

Figure 1:
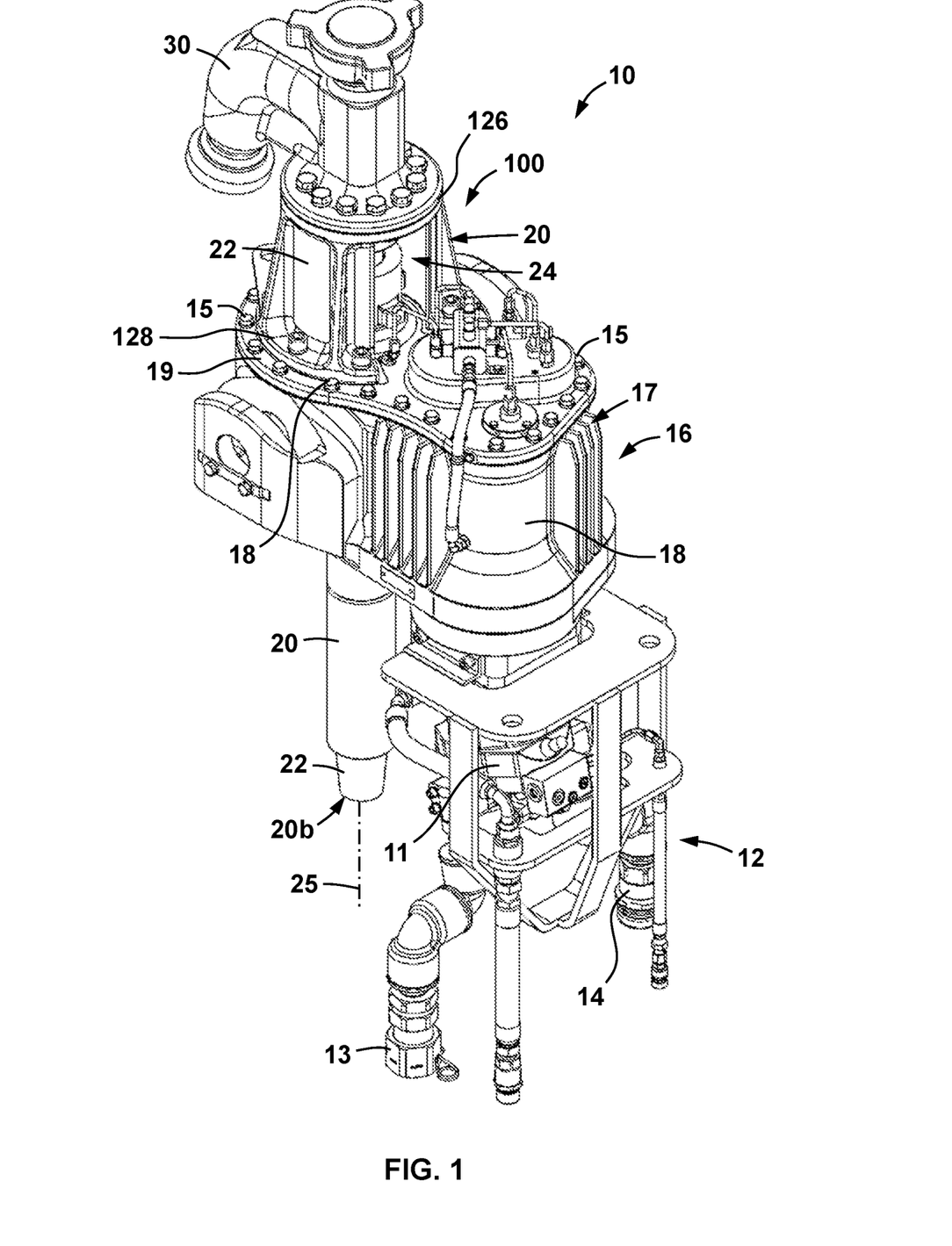
FIG. 1 is a perspective view of a power swivel including a washpipe assembly in accordance with at least some embodiments disclosed herein.
Figure 2:
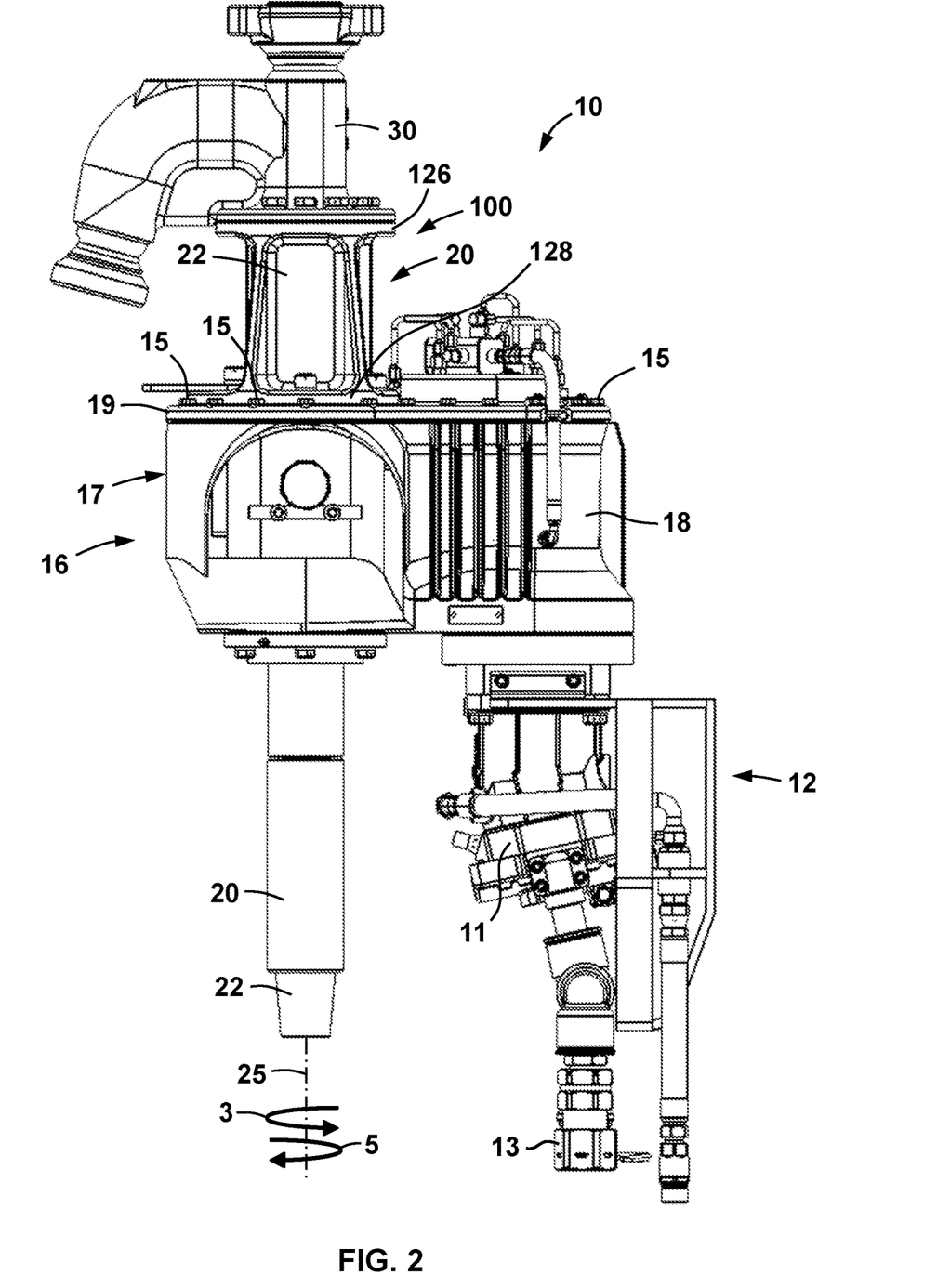
FIG. 2 is a side view of the power swivel of FIG. 1.

Referring now to FIGS. 1 and 2, a power swivel 10 for rotating a tubular string (e.g., a drill string) to form or extend a subterranean borehole is shown. In general, power swivel 10 includes a motor 12, a gear box 16, a stem 20, a gooseneck 30, and a washpipe assembly 100. Motor 12 may be any suitable motor or other driving mechanism that is configured to output a torque to drive rotation of stem 20 (and thus the tubular string coupled thereto). For example, in some embodiments, motor 12 comprises a hydraulic motor, electric motor, an internal combustion engine, or some combination thereof. In this embodiment, motor 12 comprises a hydraulic motor and includes a motor body 11, an inlet 13, and an outlet 14 (outlet is shown in FIG. 1). During operations, inlet 13 receives a flow of pressurized fluid (e.g., hydraulic fluid) and routes the same through motor body 11 and out from outlet 14. Forcing the pressurized fluid through motor body 11 causes an output shaft (not shown) to rotate. Upon being routed through motor body 11, the now spent fluid is emitted from outlet 14 where it may then be recirculated, re-pressurized, and flowed back to inlet 13 or is simply discarded.

Gear box 16 includes an outer housing 17 that encloses one or more gears, bearings, and/or other torque transfer devices that transfer the torque generated by motor 12 to stem 20. Housing 17 includes a main casing body 18 and a top or lid 19 secured to body 18 with a plurality of coupling members 15. Coupling members 15 may be any suitable member or device for joining and securing two components to one another, and may include, for example, screws, bolts, rivets, etc. Regarding the internal configuration of the gears, bearings, etc. within housing 17 of gear box 16, one of ordinary skill will appreciate that the internal gears or other torque transfer devices within gear box 16 may be disposed in various known configurations or designs. As a result, a detailed discussion of the internal configuration of the gears, shafts, bearings, etc. within gear box 16 is omitted herein in the interests of brevity.

Figure 3:
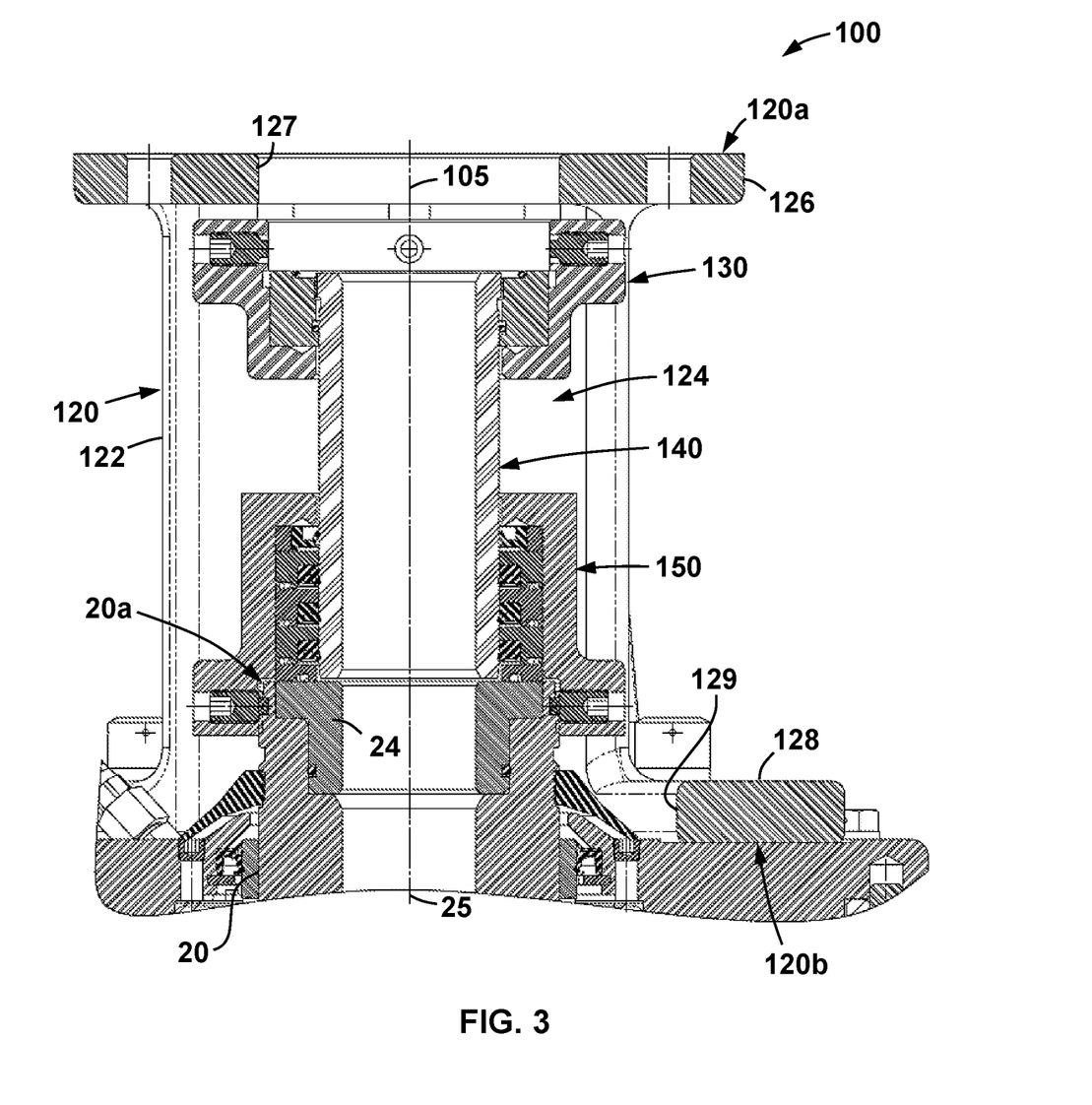
FIG. 3 is a side cross-sectional view of the washpipe assembly of FIG. 1.

Referring still to FIGS. 1 and 2, stem 20 is used to transfer the torque generated by motor 12 to a tubular string and drill bit (not shown) during operations. As shown, stem 20 comprises a tubular member including a central or longitudinal axis 25, a first or upper end 20a disposed within outer housing 17 of gear box 16 (note: upper end 20a of stem 20 is shown in FIG. 3), and a second or lower end 20b extending outward from outer housing 17. Lower end 20b includes a threaded connector 22, which in this embodiment comprises a threaded pin connector having a plurality of external threads for coupling with a threaded box connector on an upper end of the tubular string (not shown). As previously mentioned above, stem 20 is operationally coupled to motor 12 via the gears and/or other torque transfer devices within gear box 16 such that rotation of the output shaft of motor 12 (not specifically shown in FIGS. 1 and 2) causes a corresponding rotation of stem 20 about axis 25. When stem 20 is coupled to a tubular string (e.g., at threaded connector 22) that extends into a subterranean borehole, the rotation of stem 20 about axis 25 also causes rotation of the tubular string and any tools that are disposed on the axially lower end thereof (e.g., a drill bit).

In this embodiment, flow of pressurized fluid from inlet 13 through motor body 11 and out of outlet 14 causes rotation of stem 20 in a first direction 3 about axis 25, while flow of pressurized fluid from outlet 14 through body 11 and out of inlet 13 causes stem 20 rotate in a second direction 5 about axis 25 that is opposite the first direction 3 (see FIG. 2). Thus, references to inlet 13 as an "inlet" and outlet 14 as an "outlet" are merely made as a matter of convenience, and power swivel 10 may be operated to rotate stem 20 in either the first direction 3 or the second direction 5 during operations.

During drilling operations with power swivel 10, a tubular string (not shown) is coupled to stem 20 at connector 22, and a drill bit is further secured to the axially opposite end of the tubular string. Thereafter, stem 20 is rotated about axis 25 (e.g., in direction 3 or 5) in the manner described above (i.e., by motor 12) to cause a corresponding rotation of the tubular string and drill bit. When drill bit is placed in contact with a subterranean formation, rotation of the drill bit (via power swivel 10) causes the bit to form or extend a borehole therein. During these drilling operations, drilling fluids (e.g., drilling mud) are supplied to stem 20 from a fluid source (e.g., a tank, pit, etc.) through gooseneck 30 and washpipe assembly 100. The drilling fluids are then emitted from lower end 20b of stem 20 and routed through the tubular string and drill bit in order to, among other things, cool the drill bit, lubricate the engagement between the bit and the formation, and carry cuttings of the formation back to the surface. The structural details of washpipe assembly 100 will now be described in more detail below.

Referring now to FIGS. 1-3, washpipe assembly 100 includes a central axis 105 that is generally aligned with axis 25 of stem 20 during operations, an outer housing or bonnet 120, an upper packing assembly 130, a washpipe 140, and a lower packing assembly 150. Upper packing assembly 130 and washpipe 140 are secured to gooseneck and bonnet 120, which are further secured to lid 19 of gear box 16, and lower packing assembly 150 is secured to upper end 20a of stem 20. Therefore, as described in more detail below, during operations lower packing assembly 150 rotates about axes 105, 25 along with stem 20, while upper packing assembly 130 and washpipe 140 remain stationary with respect to lid 19 and housing 17 of gear box 16. Thus, lower packing assembly 150 provides sealing engagement between stem 20 (which rotates about axes 105, 25) and washpipe 140 (which does not rotate about axes 105, 25), such that washpipe 140 may provide fluids (e.g., drilling fluids between gooseneck 30 and stem 20 during drilling operations with power swivel 10.

Bonnet 120 includes a first or upper end 120a, a second or lower end 120b opposite upper end 120a, a plurality of axially extending support walls 122 extending between ends 120a, 120b that define an inner area 124 therein. An upper connection flange 126 is disposed at upper end 120a and is configured to engage and mate with a corresponding connection flange on gooseneck 30 (note: gooseneck 30 is not shown in FIG. 3 so as not to unduly complicate the figure). Upper connection flange 126 includes a central aperture or port 127 that extends axially from upper end 120a to inner area 124. A lower connection flange 128 is disposed at lower end 120b and is configured to engage and mate with lid 19 of housing 17. Lower connection flange 128 includes a central aperture or port 129 that extends axially from lower end 120b to inner area 124. As best shown in FIG. 3, port 129 receives upper end 20a of stem 20 therethrough during operations.

Figure 4:
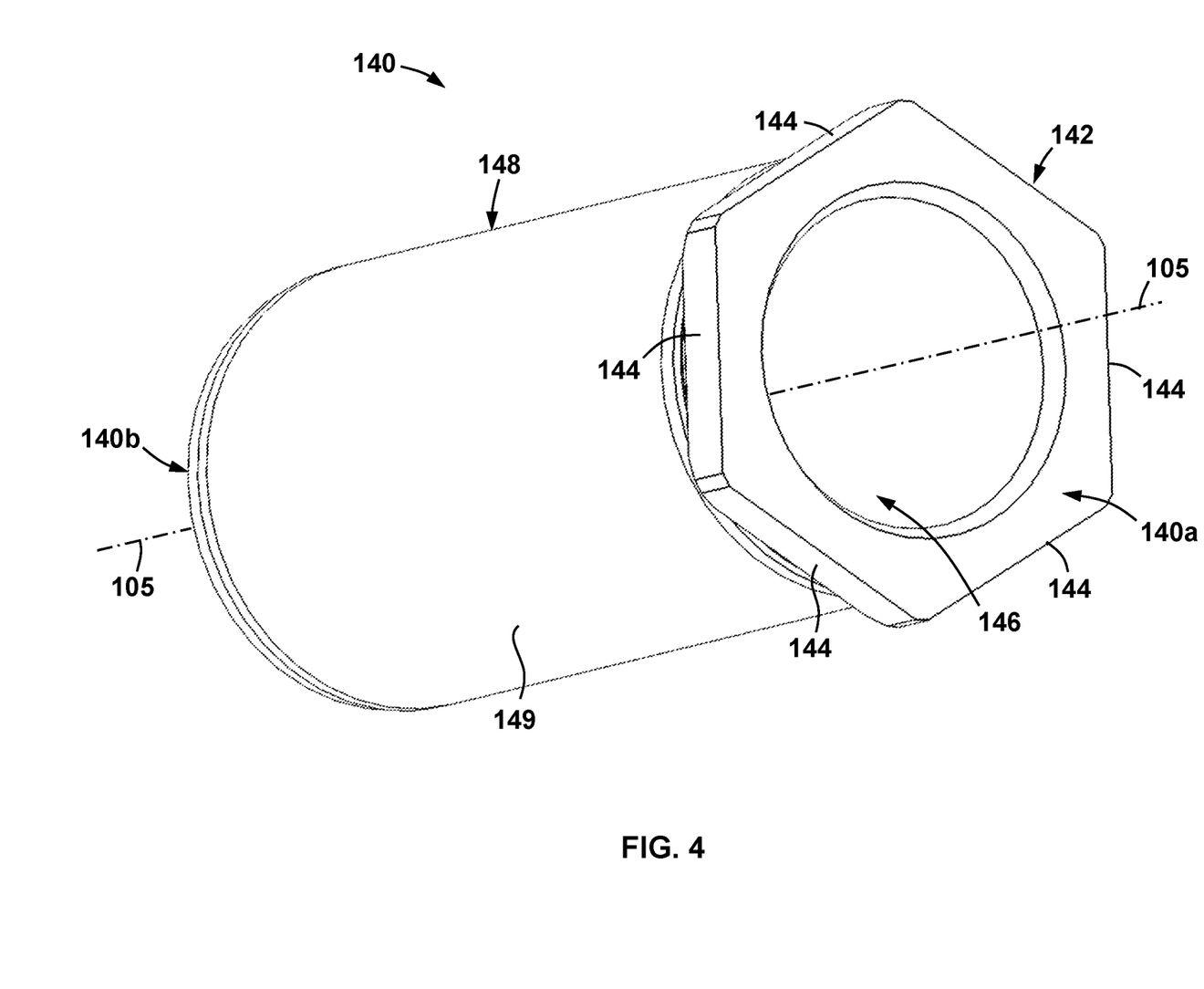
FIG. 4 is a perspective view of the washpipe assembly of FIG. 3.

Referring now to FIG. 4, washpipe 140 includes a first or upper end 140a, a second or lower end 140b opposite upper end 140a, and a throughbore 146 extending axially between ends 140a, 140b along axis 105. In addition washpipe 140 includes a tubular body 148 having a radially outermost cylindrical surface 149 extending axially from lower end 140b, and an upper connection profile 142 extending from tubular body 148 to upper end 140a. Upper connection profile 142 includes a polygonal shape having a plurality of facets or planar surfaces 144 circumferentially arranged about axis 105. In this embodiment, connection profile 142 includes a hexagonal shape, and thus includes a total of six (6) planar surfaces 144 evenly circumferentially spaced about axis 105. However, it should be appreciated that in other embodiments, connection profile 142 may be formed into a variety of shapes, such as, for example, square, rectangular, pentagonal, octagonal, etc. Therefore, the hexagonal profile of connection profile 142 shown in FIG. 4 is merely representative of this embodiment and should not be taken as an implication that all other such embodiments of connection profile 142 are similarly configured.

In at least some embodiments, radially outer cylindrical surface 149 of washpipe 140 is coated or covered (at least partially) with a surface coating for reducing contact friction therealong. For example, in some embodiments, radially outer cylindrical surface 149 is coated with chrome and/or nickel plating, tungsten carbide, etc. In some embodiments, radially outer cylindrical surface 149 is hardened (e.g., through an induction hardening process) prior to applying the coating or covering thereto.

Figure 5:
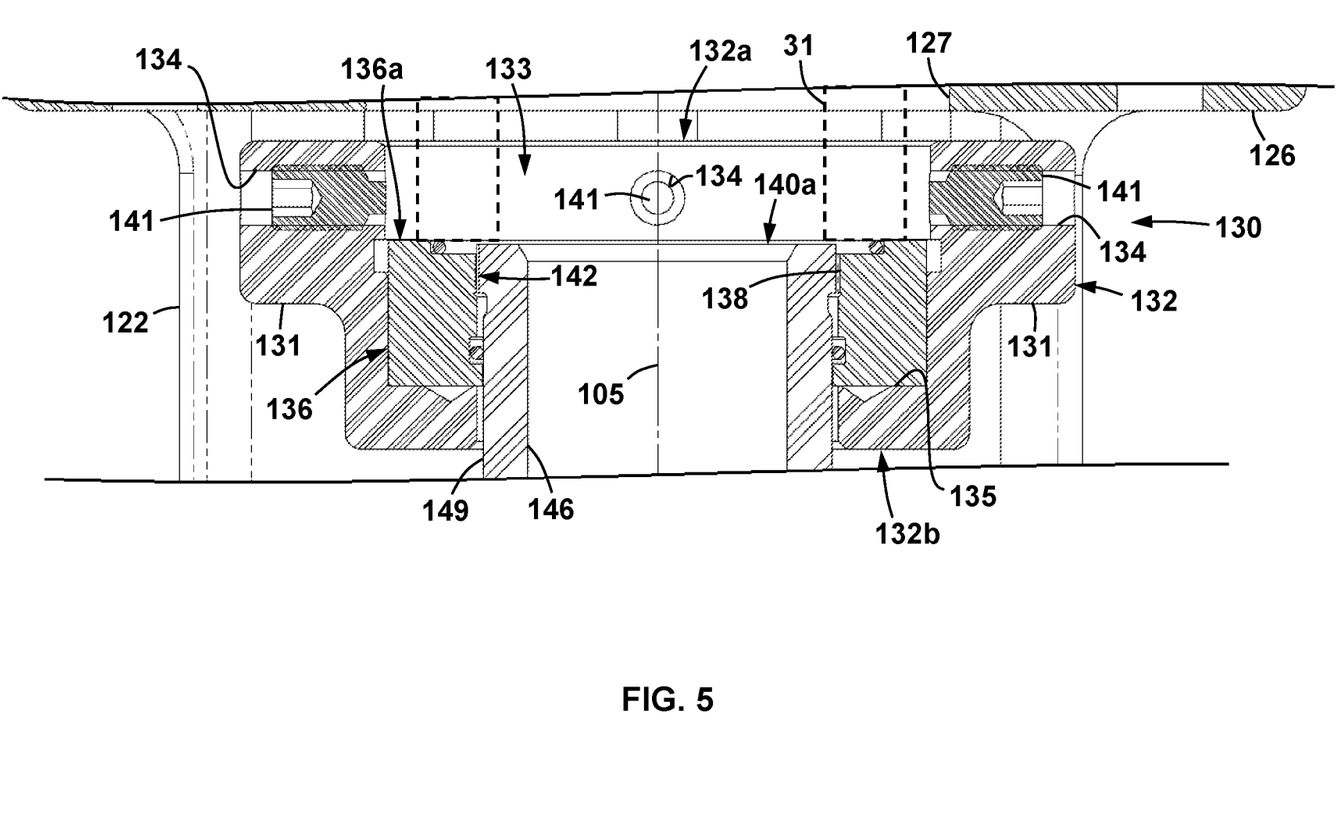
FIG. 5 is an enlarged side cross-sectional view of the upper packing assembly of the washpipe assembly of FIG. 3.
Figure 6:
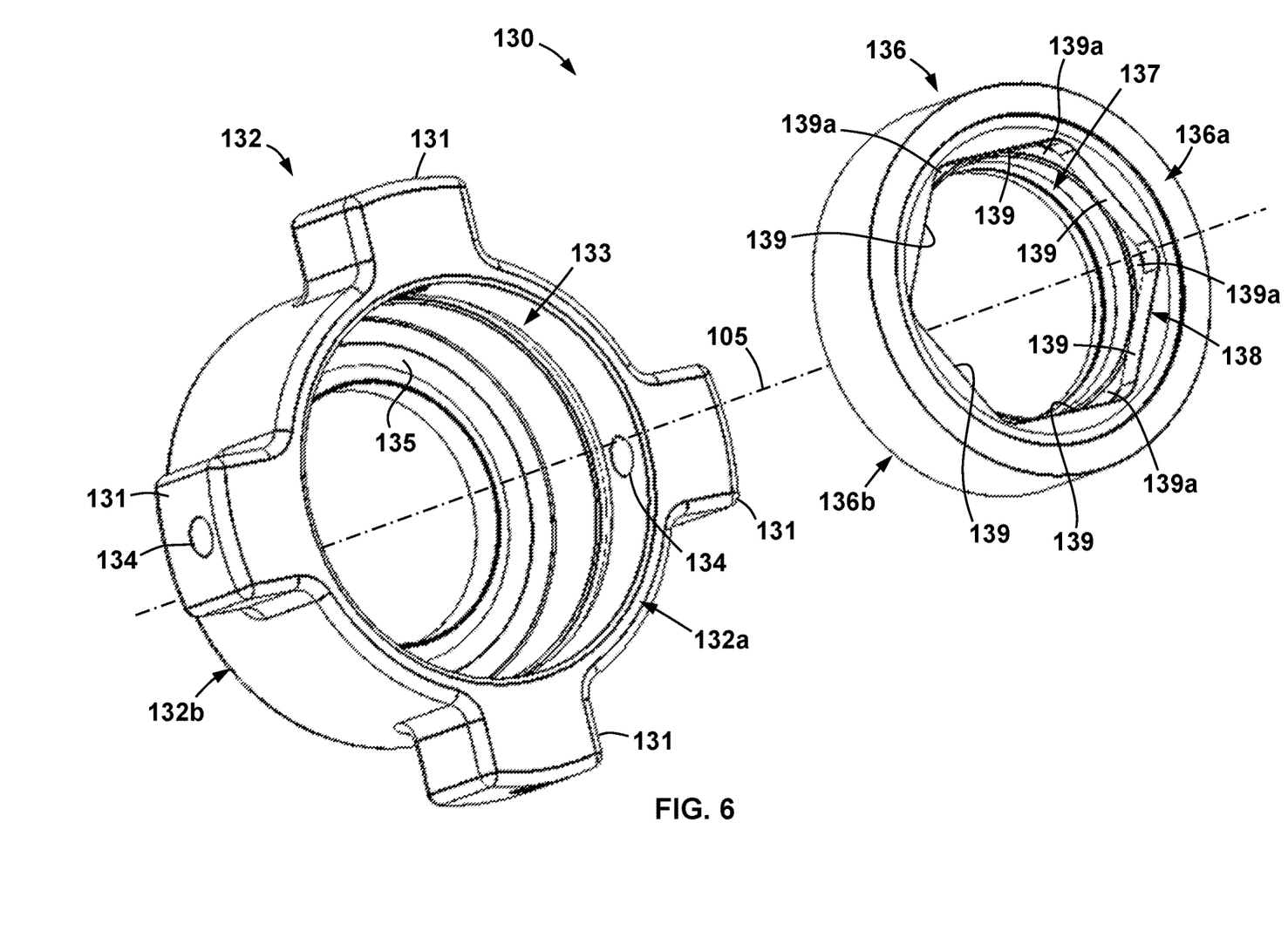
FIG. 6 is an exploded view of the upper packing assembly of the washpipe assembly of FIG. 3.

Referring now to FIGS. 5 and 6, upper packing assembly 130 includes an upper packing nut 132 and an upper retainer ring 136. Upper packing nut 132 includes a first or upper end 132a, a second or lower end 132b opposite upper end 132a, and a throughbore 133 extending axially along axis 105 between ends 132a, 132b. In addition, as best shown in FIG. 6, a plurality of radially extending projections 131 are evenly circumferentially spaced about upper packing nut 132. Each projection 131 includes a bore 134 extending radially therethrough into throughbore 133 (see FIG. 5). In this embodiment, there are a total of four (4) projections 131 that are spaced approximately 90° apart from one another about axis 105; however, the number and spacing of projections 131 may be varied in other embodiments. Further, an annular mounting shoulder 135 extends radially within throughbore 133 proximate to lower end 132b.

Figure 7:
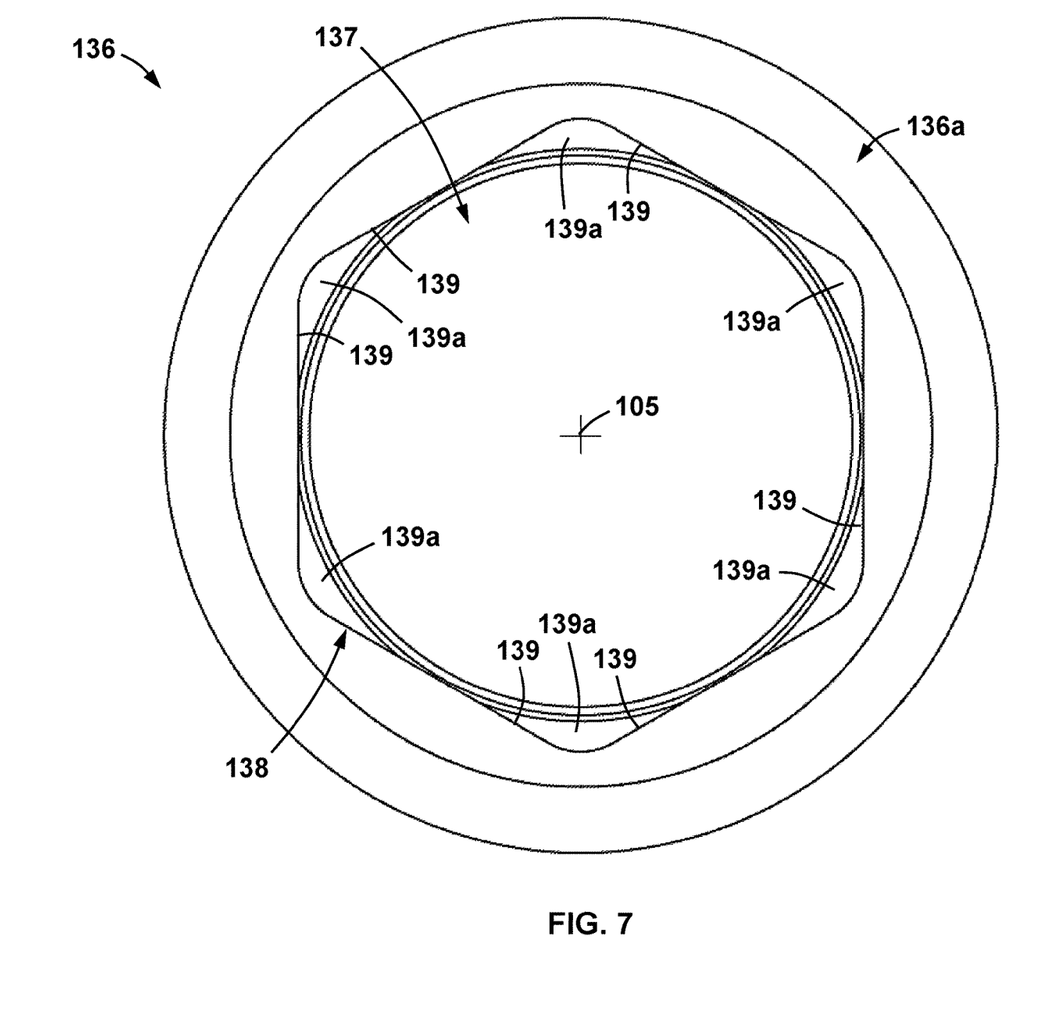
FIG. 7 is a top axial view of the retainer ring of the upper packing assembly of FIGS. 5 and 6.

Referring now to FIGS. 5-7, upper retainer ring 136 is an annular or ring-shaped member that includes a first or upper end 136a, second or lower end 136b opposite upper end 136a, and a throughbore 137 extending axially along axis 105 between ends 136a, 136b. In addition, upper retainer ring 136 includes a connection profile 138 within through bore 137 proximate (or at) to upper end 136a. As best shown in FIG. 7, connection profile 138 includes a polygonal shape having a plurality of facets or planar surfaces 139 circumferentially arranged about axis 105. At the junction or corners of planar faces 139, a plurality of radially extending shoulders 139a are formed. In this embodiment, connection profile 138 is shaped to correspond and mate with the connection profile 142 on washpipe 140. As a result, in this embodiment, connection profile 138 includes a hexagonal shape, and thus includes a total of six (6) planar surfaces 139 evenly circumferentially spaced about axis 105. However, connection profile 138 may be formed into a variety of shapes to substantially match and correspond with connection profile 142 on washpipe 140.

Referring now to FIGS. 3, and 5-7, during assembly, upper retainer ring 136 is inserted within throughbore 133 of upper packing nut 132 along axis 105 until lower end 136b of upper retainer ring 136 engages or abuts shoulder 135. Thereafter, washpipe 140 may be inserted into throughbore 137 of upper retainer ring 136 until connection profile 142 on washpipe 140 is received within connection profile 138 on upper retainer ring 136. As connection profile 142 is received within connection profile 138, planar surfaces 144 on connection profile 142 are aligned within planar surface 139 on connection profile 138, and connection profile 142 axially engages or abuts with shoulders 139a. Thus, washpipe 140 is axially suspended from shoulders 139a within upper seal assembly 130.

Referring now to FIGS. 1-3, 5, and 6, once connection profile 142 is seated on shoulders 139a as described above, gooseneck 30 is secured to connection flange 126 such that a cylindrical projection 31 on gooseneck 30 extends axially through port 127 and into throughbore 133 (note: cylindrical projection 31 of gooseneck 30 is schematically shown in FIG. 5 with a broken line). To secure upper packing assembly 130 to gooseneck 30 and thus flange 126, a plurality of set screws 141 are threadably advanced through bores 134 extending radially through projections 131 until a radially inner end 141a of each set screw 141 engages with the cylindrical projection 31 of gooseneck 30.

Figure 8:
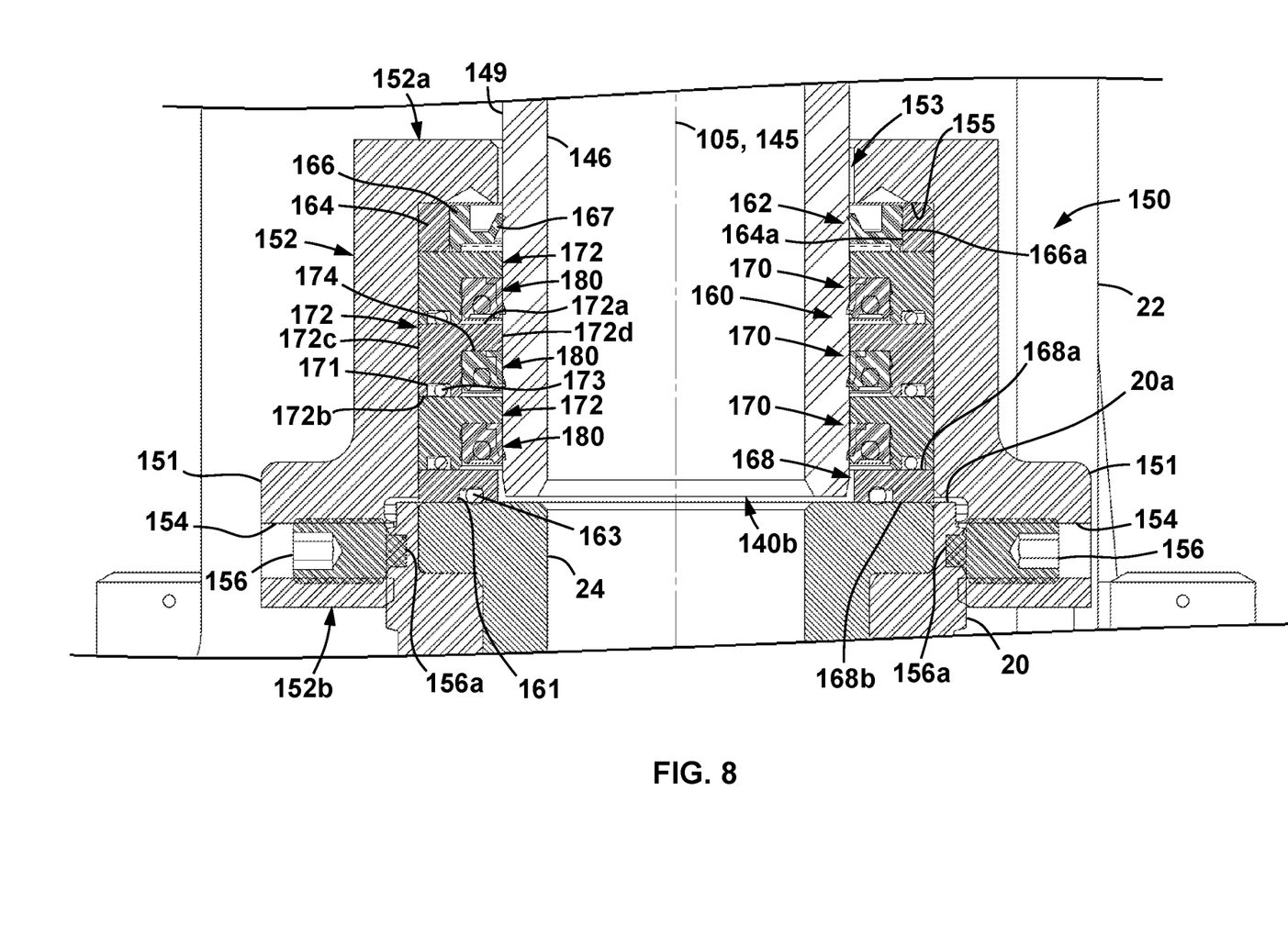
FIG. 8 is an enlarged side cross-sectional view of the lower packing assembly of the washpipe assembly of FIG. 3.

Referring now to FIG. 8, lower packing assembly 150 includes a lower packing nut 152, and a seal assembly 160. Lower packing nut 152 includes a first or upper end 152a, a second or lower end 152b opposite upper end 152a, and a throughbore 153 extending axially between ends 152a, 152b along axis 105. An annular mounting shoulder 155 extends radially within throughbore 153 proximate to upper end 152a. In addition, lower packing nut 152 includes a plurality of radially extending projections 151 that are evenly circumferentially spaced about lower packing nut 152. Each projection 151 includes a radially-extending bore 154 extending into throughbore 153. In this embodiment, there are a total of four (4) projections 151 that are spaced approximately 90° apart from one another about axis 105 (note: only two projections 151 are shown in FIG. 8); however, the number and spacing of projections 151 may be varied in other embodiments.

Seal assembly 160 is disposed within throughbore 153 of lower packing nut 152 and includes an upper wiper seal 162, a lower engagement member 168, and a plurality of axially stacked seals 170 disposed axially between wiper seal 162 and engagement member 168 along axis 105. Upper wiper seal 162 includes an annular carrier 164 and an annular wiper seal member 162. Wiper seal member 166 is disposed radially within carrier 164 such that a radially outermost surface 166a of wiper seal member 166 is engaged with a radially innermost surface 164a of carrier 164. Wiper seal member 166 includes an inwardly projecting skirt 167 that engages with radially outermost cylindrical surface 149 on cylindrical body 148 of washpipe 140. As described in more detail below, the engagement between surface 149 and skirt 167 prevents or at least restricts the flow or migration of contaminants (e.g., solid and/or liquid matter) axially between upper wiper seal 162 and surface 149 during operations.

Referring still to FIG. 8, lower engagement member 168 is an annular or ring-shaped member that includes a first or upper end 168a, and a second or lower end 168b opposite upper end 168a. As described in more detail below, lower end 168b of lower engagement member 168 engages or abuts stem 20. Specifically, as shown in FIG. 8, in this embodiment lower end 168b of engagement member 168 engages or abuts a wearable insert 24 disposed within the throughbore of stem 20 at upper end 20a. Without being limited to this or any other theory, the use of wearable insert 24 eliminates direct engagement between seal assembly 160 and the body of stem 20, such that the usable life of the body of stem 20 itself may be increased. A recess 161 extends axially into lower end 168b along axis 105. As also shown in FIG. 8, recess 161 houses an annular sealing member 163 (e.g., an O-ring). Thus, when lower end 168b of lower engagement member 168 engages with wearable insert 24 within stem 20, sealing member 163 is axially compressed between recess 161 and insert 24 such that a static seal is created between lower engagement member 168 and wearable insert 24 that prevents (or at least greatly restricts) the flow of fluids radially between lower engagement member 168 and insert 24 during operations.

Each seal 170 includes a carrier 172 and an annular sealing member 180 disposed within carrier 172. Carrier 172 is an annular or ring-shaped member that includes a first or upper end 172a, a second or lower end 172b opposite upper end 172a, a radially innermost surface 172c, and a radially outermost surface 172d. A recess 171 extends axially into carrier 172 from lower end 172d that houses an annular sealing member 173 (e.g., an O-ring) therein. As described in more detail below, the annular sealing member 173 forms a static seal between carrier 172 and the axially adjacent component (e.g., another carrier 172 or lower engagement member 168) disposed immediately axially below carrier 172 within seal assembly 160. In addition, carrier 172 includes another recess 174 extending radially from radially innermost surface 172d and axially from lower surface 172b. As shown in FIG. 8, recess 174 receives annular sealing member 180 therein during operations. Carrier 172 may comprise any suitable rigid material for providing sufficient support for annular sealing member 180 during operations and that is suitable for the particular operating environment (e.g., a metal, a composite, a polymer, etc.). In this embodiment, carrier 172 comprises carbon steel; however, other materials are possible.

Figure 9:
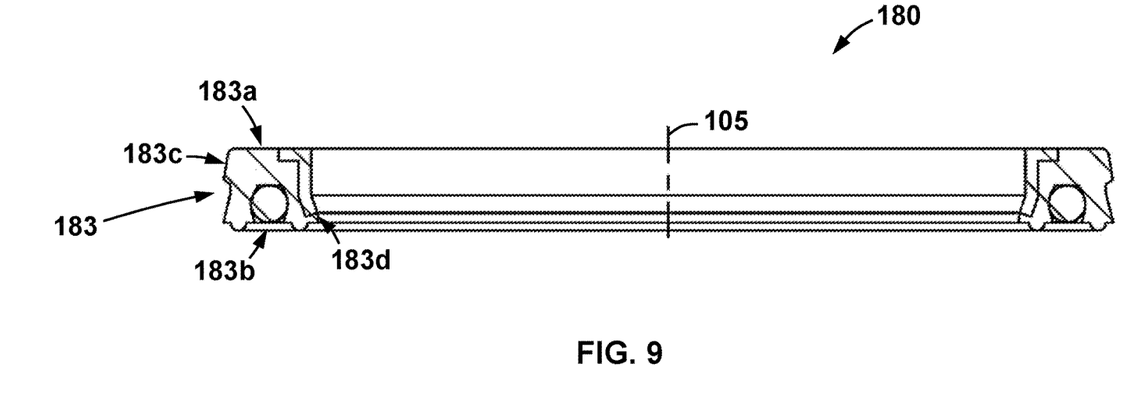
FIG. 9 is a side cross-sectional view of one of the sealing members of the lower packing assembly of FIG. 8.
Figure 10:
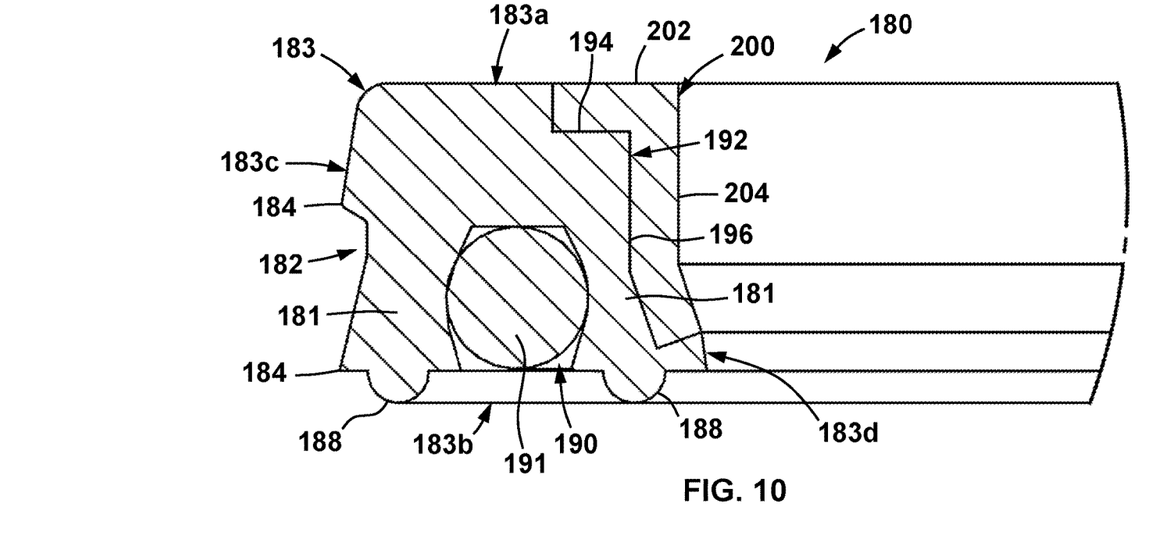
FIG. 10 is an enlarged cross-sectional view an end of the sealing member shown in FIG. 9.

Referring now to FIGS. 9 and 10, each annular seal 180 includes a ring-shaped body 183 that includes a first end 183a, a second end 183b opposite first end 183a, a radially outermost surface 183c, and a radially innermost surface 183d. A recess 182 extends radially into body 183 from radially outermost surface 183c such that a pair of lips or engagement corners 184, 186 are formed along radially outermost surface 183c. In addition, a pair of radially spaced engagement projections or feet 188 extending axially from second end 183b. In this embodiment feet 188 each include a semi-circular cross-section; however, other shapes (e.g., rectangular, polygonal, triangular, etc.) are possible in other embodiments. A recess 190 extends axially into body 183 of sealing member 180 from second end 183b at a position radially between feet 188 such that a pair of axially extending projections 181 are defined on body 183 on either radial side of recess 190. Each axially extending projection 181 includes one of the feet 188. An annular sealing member 191 (e.g., an O-ring) is inserted within recess 190. As shown in FIG. 10, annular sealing member 191 is radially wider than recess 190 such that when annular sealing member 191 is inserted within recess 190, axially extending projection 181 are biased radially apart from one another.

A mounting recess 192 extends both into both first end 183a and radially innermost surface 183d of body 183. Specifically, recess 192 includes a first portion 194 extending axially into first end 183a and a second portion 196 extending radially into radially innermost surface 183d. As a result, recess 192 includes a substantially L-shaped profile when viewed in cross-section with portions 194, 196 forming the legs of the L (e.g., see FIG. 10).

An annular contact insert 200 is disposed within recess 192 that, as described in more detail below, sealingly engages with radially outer surface 149 of cylindrical body 148 of washpipe 140 during operations. Contact insert 200 includes a first portion 202 disposed within first portion 194 of recess 192 and a second portion 204 disposed within second portion 196 of recess 192. Contact insert 200 is substantially L-shaped to match the profile and shape of recess 192, with portions 202, 204 forming the legs of the L (see FIG. 10). In addition, as shown in FIG. 10, first portion 202 of contact insert 200 is mounted flush with first end 183a of body 183 and second portion 204 is mounted flush with radially innermost surface 183d of body 183.

Body 183 of annular sealing member 180 may comprise any suitable resilient, deformable material. For example, in this embodiment body 183 comprises an elastomer (e.g., rubber, nitrile, VITON®, etc.). In addition, contact insert 200 may comprise any suitable material for low friction contact with another component (e.g., radially outer cylindrical surface 149 of washpipe 140). For example, in this embodiment, contact insert 200 may comprise a polymer such as, for example, polytetrafluoroethylene (e.g., TEFLON®), perfluoroalkoxy, fluorinated ethylene propylene, or combinations thereof. In addition, contact insert 200 may be secured within recess 193 of body 183 in any suitable manner, such as, for example, welding, adhesive(s), etc. For example, in some embodiments, contact insert 200 is secured within recess 192 of body 183 with one or more adhesives.

Referring now to FIGS. 8-10, during assembly operations, sealing member 180 of each seal 170 is inserted within recess 174 of the corresponding carrier 172. Thereafter, seals 162, 170, and lower engagement member 168 of seal assembly 160 are inserted axially into throughbore 153 of lower packing nut 152 from lower end 152b. Specifically, wiper seal 162 is first inserted axially within throughbore 153 until carrier 164 and/or wiper seal 167 engages or abuts with annular shoulder 155. Thereafter, each of the seals 170 (including both carrier 172 and sealing member 180) are inserted axially into throughbore 153 such that a first or uppermost of the seals 170 engages with wiper seal 162, and each of the other seals 170 engages with the immediately axially adjacent seal 170. In particular, the upper end 172a of the carrier 172 of the uppermost of the seals 170 engages or abuts the carrier 164 and wiper seal member 166 of wiper seal 162, and the upper end 172a of the carrier 172 of each of the other seals 170 engages or abuts the lower end 172b of the carrier 172 of the immediately axially adjacent seal 170. Finally, upper end 168a of lower engagement member 168 engages or abuts with lower end 172b of the carrier 172 of the lowermost seal 170. Further, when seal assembly 160 is inserted within throughbore 153 of packing nut 152, the annular sealing member 173 within the lowermost seal 170 is axially compressed between the recess 171 and upper end 168a of lower engagement member 168, and each of the annular sealing members 173 of the other seals 170 are axially compressed between the recess 171 of the corresponding carrier 172 and the upper end 172a of the carrier 172 of the immediately axially adjacent seal 170. Thus, during operations, fluids are prevented, or at least restricted, from flowing radially between the seals 170 or radially between the lowermost seal 170 and engagement member 168.

Referring specifically to FIG. 8, once sealing assembly 160 is installed within throughbore 153 of lower packing nut 152 as described above, lower packing assembly 150 is installed onto upper end 20a of stem 20. Specifically, upper end 20a of stem 20a is inserted within throughbore 153 of lower packing nut 152 until wearable insert 24 engages or abuts with lower end 168b of lower engagement member 168 and annular sealing member 163 is axially compressed between recess 161 and insert 24 in the manner previously described above. In addition, as shown in FIG. 8, the engagement between wearable insert 24 and lower engagement member 168 also facilitates compression of the annular sealing members 173 disposed within each of the seals 170 as previously described above. Thereafter, upper end 20a of stem 20 is secured to lower packing nut 152 by threadably engaging and advancing a plurality of set screws 156 through bores 154 extending radially through projections 151 until a radially inner end 156a of each set screw 156 engages with stem 20 (note: FIG. 8 shows an interference between set screws 156 and stem 20 by depicting radially inner ends 156a of set screws 156 as extending through the outer surface of stem 20; however, it should be appreciated that radially inner ends 156a of set screws 156 will not in practice actually penetrate the outer surface of stem 20 during operations).

Finally, as is also shown in FIG. 8, cylindrical body 148 of washpipe 140 is inserted within throughbore 153 of lower packing nut 152 until lower end 140b is axially proximate to upper end 20a of stem 20. In addition, when cylindrical body 148 of washpipe 140 is inserted within throughbore 153, wiper seal 162 and each of the seals 170 engages with radially outer cylindrical surface 149. Specifically, referring to FIGS. 8 and 10, radially outer surface 149 engages with skirt 167 on wiper seal 162 and with contact inserts 200 on seals 170. In particular, for each of the seals 170, because projections 181 are radially biased radially apart from one another due to the insertion of annular sealing member 191 within recess 190, lips 184, 186 (particularly lip 186) is biased into engagement with recess 174 of carrier 172, and second portion 204 of contact insert 200 is biased into engagement with radially outer surface 149.

Referring now to FIGS. 1-3, 5, and 8, during operations, stem 20 is driven to rotate about axes 105, 25 by motor 12 in the manner previously described above. Because lower packing nut 152 is secured to upper end 20a of stem 20 via set screws 156, as stem 20 rotates about axes 105, 25, lower packing assembly (including both lower packing nut 152 and seal assembly 160) also rotate about axes 105, 25 along with stem 20. However, because upper packing assembly 130 is further fixed to gooseneck 30 and upper connection flange 126 of bonnet 20 in the manner previously described, and because planar surfaces 144 on connection profile 142 of washpipe 140 are engaged with planar surface 139 on connection profile 138 of retainer ring 136 in upper packing assembly 130 (see FIGS. 4, 5, and 7), washpipe 140 is prevented from rotating along with stem 20 and lower packing assembly 150 about axes 105, 25 (and axis 145) due to the engagement of planar surfaces 144, 139 (see FIGS. 4 and 7). As a result, seals 162, 170 (particularly skirt 167 and second portions 204 of contact inserts 200) slidingly engage with radially outer cylindrical surface 149 of washpipe 140 during operations. Therefore, skirt 167 of wiper seal 162 forms a dynamic seal with radially outer cylindrical surface 149 that is configured to prevent the flow or migration of contaminants between wiper seal 162 and washpipe 140 into lower packing nut 152 from the outer environment as previously described above. In addition, contact inserts 200 (particularly second portion 204 of each insert 200) forms a dynamic seal with radially outer cylindrical surface 149 that prevents or at least greatly restricts the flow of fluid (e.g., drilling fluid) between seals 170 and washpipe 140 during operations.

While embodiments disclosed herein have only included seals 170 within lower packing assembly 150, it should be appreciated that seals 170 may be utilized in other locations within washpipe assembly 100 in other embodiments. For example, referring now to FIG. 11, another embodiment of upper packing assembly 230 is shown. Upper packing assembly 230 is substantially similar to upper packing assembly 130, previously described, and thus, like numerals will be used to designate like components and the description below will focus on the components and features of upper packing assembly 230 that are different from upper packing assembly 130.

Figure 11:
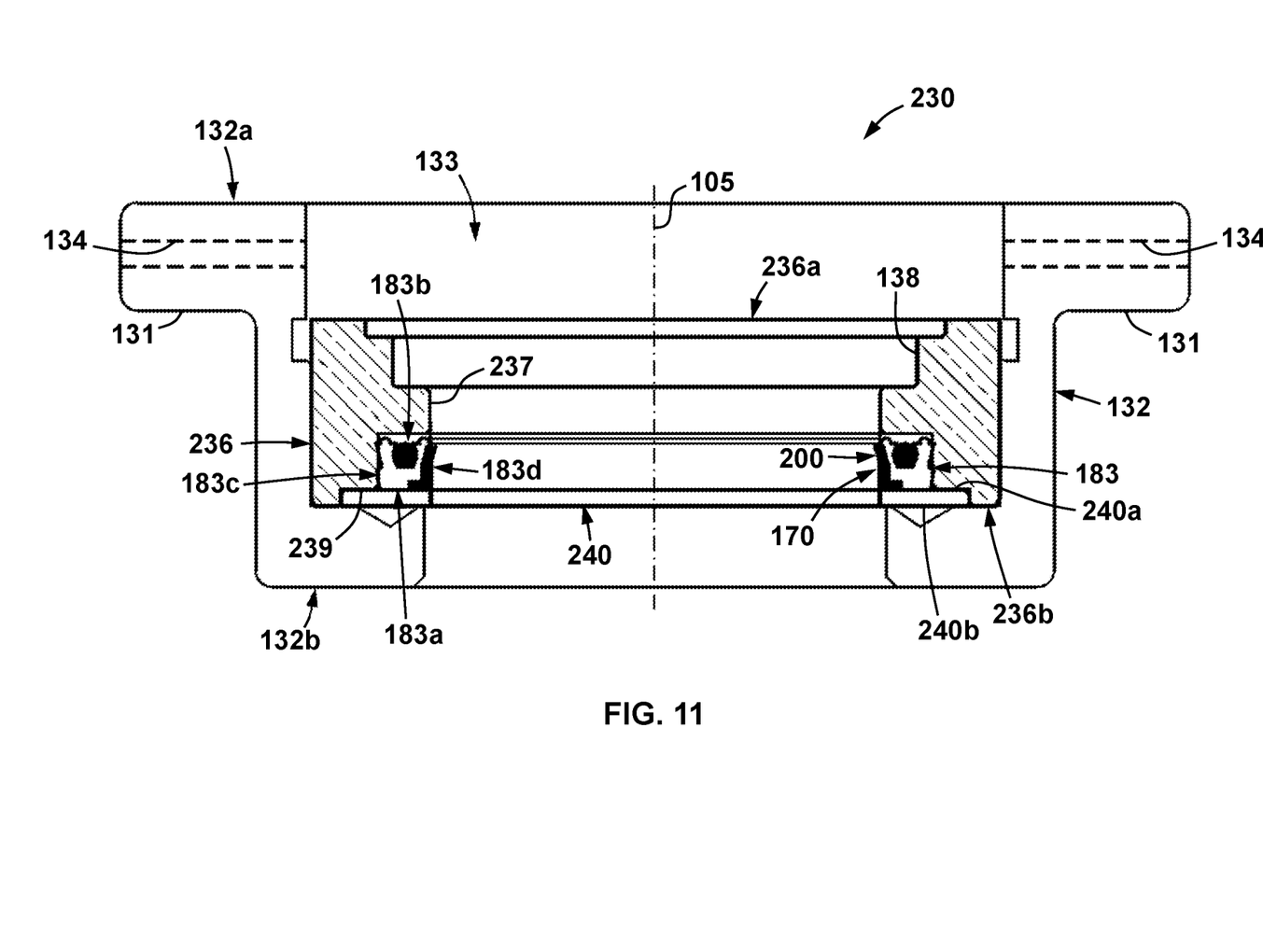
FIG. 11 is a side cross-sectional view of another upper packing assembly for use within the washpipe assembly of FIG. 3.

In particular, as shown in FIG. 11, upper packing assembly 230 includes upper packing nut 132 (previously described), an upper retainer ring 236 in place of upper retainer ring 136, a seal 170 (previously described), and an engagement member 240. Upper retainer ring 236 is an annular or ring-like member that includes a first or upper end 236a, a second or lower end 236b opposite upper end 236a, and a throughbore 238 extending axially along axis 105 between ends 236a, 236b. Connection profile 138, being the same as previously described, is disposed within throughbore 238 proximate upper end 236a. In addition, throughbore 238 also includes a first or upper radially extending annular shoulder 237 axially disposed between connection profile 138 and lower end 236b, and a second or lower radially extending annular shoulder 239 axially disposed between upper annular shoulder 237 and lower end 236b. Upper annular shoulder 237 is radially spaced from lower annular shoulder 239—with lower annular shoulder 239 being disposed radially outside of upper annular shoulder 237.

Engagement member 240 is an annular, ring shaped member having a first or upper planar surface 240a, and a second or lower planar surface 240b opposite upper planar surface 240b. In other words, engagement member 240 resembles a ring-shaped washer.

Referring still to the embodiment of FIG. 11, during operations, seal 170 is inserted within throughbore 238 from lower end 236b of upper retainer ring 236 such that end 183b of body 183 engages or abuts with upper annular shoulder 237. Thereafter, engagement member 240 is inserted within throughbore 238 from lower end 236b such that upper planar surface 240a engages or abuts with end 180a of body 183 on seal 170 and lower planar surface 239. Finally, upper retainer ring 236, with seal 170 and engagement member 240 installed therein as described above, is inserted within throughbore 133 from upper end 132a of upper packing nut 132 until lower planar surface 240 and lower end 238b of retainer ring 238 engage or abut with annular shoulder 135 within throughbore 133.

Thereafter, washpipe 140 may be installed within upper packing nut 132 and retainer ring 238 in substantially the same manner as described above for upper packing assembly 130. However, in this embodiment of FIG. 11, radially outer cylindrical surface 149 of washpipe 140 engages with seal 170 (particularly with contact insert 200 in seal 170). Because washpipe 140 and upper packing assembly 130 do not rotate relative to one another during operations as previously described with respect to other embodiments, the contact between seal 170 (e.g., contact insert 200) and radially outer cylindrical surface 149 forms a static seal to prevent or at least restrict the flow of fluid between seal 170 in upper packing assembly 230 and washpipe 140 during operations.

In the manner described, through use of a washpipe assembly in accordance with the embodiments disclosed herein (e.g., washpipe assembly 100) or a power swivel incorporating such a washpipe assembly (e.g., power swivel 10), a high pressure fluid (e.g., drilling fluid) may be delivered from a stationary gooseneck (e.g., gooseneck 31) to a rotating stem (e.g., stem 20) and drill string in order to facilitate drilling operations of a subterranean wellbore.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A washpipe assembly for a power swivel, comprising:
a washpipe including a central axis and a radially outermost cylindrical surface; and
a first packing assembly configured to be coupled to a stem of the power swivel, wherein the first packing assembly includes a seal assembly;
wherein the seal assembly includes a plurality of axially stacked first annular seal members, each of the plurality including a carrier, a seal body retained in a recess in the carrier, and a contact insert mounted to the body, the contact insert engaging and forming a dynamic seal with the radially outermost cylindrical surface of the washpipe.

2. The washpipe assembly of claim 1, wherein the body of each of the first annular seal members comprises an elastomer; and
wherein the contact insert of each of the first annular seal members comprises a polymer.

3. The washpipe assembly of claim 2, wherein the contact insert of each of the first annular seal members comprises polytetrafluoroethylene.

4. The washpipe assembly of claim 1, wherein the contact insert has an L-shaped profile when viewed in cross section.

5. The washpipe assembly of claim 1, wherein the seal assembly further comprises a wiper seal that comprises:
a carrier; and
a wiper seal member including an annular skirt that is configured to engage with the radially outermost cylindrical surface of the washpipe.

6. The washpipe assembly of claim 1, further comprising a second packing assembly configured to be coupled to a bonnet of the power swivel;
wherein the washpipe further comprises a first connection profile mating with a second connection profile disposed on the second packing assembly to prevent relative rotation of the washpipe relative to the second packing assembly about the central axis.

7. The washpipe assembly of claim 6, wherein the first connection profile and the second connection profile each comprise a polygonal shape including a plurality of planar surfaces.

8. A washpipe assembly for a power swivel, comprising:
a washpipe including a central axis and a radially outermost cylindrical surface; and
a first packing assembly configured to be coupled to a stem of the power swivel, wherein the first packing assembly includes a seal assembly;
wherein the seal assembly includes one or more first annular seal members each including a body and a contact insert mounted to the body, the contact insert engaging and forming a dynamic seal with the radially outermost cylindrical surface of the washpipe; and
wherein the body of the one or more first annular seal members includes a pair of axially extending annular projections separated by an annular recess, and wherein the seal assembly further comprises a second annular seal member that is disposed in the annular recess and is configured to bias the axially extending projections apart from one another.

9. The washpipe assembly of claim 8 wherein the body of the one or more first annular seal members includes a first end, a second end opposite the first end, a radially outermost surface, and a radially innermost surface; and
wherein the contact insert covers a portion of the radially innermost surface and a portion of the first end; and
wherein each of the pair of axially extending annular projections extends from the second end and terminates in a foot that extends axially further than the second annual seal member.

10. The washpipe assembly of claim 9 wherein the radially outermost surface includes a circumferential recess disposed about the body and an engagement corner on each side of the recess.

11. A power swivel for rotating a tubular string to form a borehole in a subterranean formation, the power swivel comprising:
a motor;
a stem coupled to the motor to rotate the stem about a rotational axis, wherein the stem is configured to be coupled to the tubular string;
a washpipe assembly in fluid communication with the stem, wherein the washpipe assembly includes a central axis and comprises:
a washpipe including a radially outermost cylindrical surface; and
a lower packing assembly coupled to the stem, wherein the lower packing assembly includes a seal assembly;
wherein the seal assembly includes a plurality of axially stacked annular seal members, each of the seal members of the plurality including a carrier having a recess, a seal body disposed in the recess of the carrier, and a contact insert mounted to the body, wherein the contact insert is sealingly engaged with the radially outermost cylindrical surface of the washpipe.

12. The power swivel of claim 11, wherein the body of each of the annular seal members comprises an elastomer; and
wherein contact insert of each of the annular seal members comprises a polymer.

13. The power swivel of claim 12 wherein the contact insert of each of the annular seal members comprises polytetrafluoroethylene.

14. The power swivel of claim 11, wherein the seal assembly further comprises a wiper seal that comprises a wiper seal member including an annular skirt that is engaged with the radially outermost cylindrical surface of the washpipe.

15. The power swivel of claim 11, wherein the recess of the carrier has an L-shaped profile when viewed in cross section and wherein contact insert is L-shaped when viewed in cross section.

16. The power swivel of claim 15, wherein the lower packing assembly further comprises a lower packing nut that is mounted to the stem and includes a throughbore;
wherein the seal assembly further comprises an engagement member;
wherein the stem includes an insert disposed therein;
wherein the wiper seal is engaged with an annular shoulder within the throughbore;
wherein the engagement member is engaged with the insert; and
wherein the one or more carriers and one or more annular seal members are axially stacked between the wiper seal and the engagement member within the throughbore of the lower packing nut.

17. The power swivel of claim 16, further comprising:
a gear box including a housing;
a bonnet coupled to the housing;
an upper packing assembly coupled to the bonnet, wherein the upper packing assembly comprises:
  an upper packing nut including a throughbore; and
  a retainer ring disposed within the througbore, the retainer ring including a connection profile;
wherein the washpipe extends through the throughbore of the upper packing nut and includes a connection profile that is mated with the connection profile on the retainer ring such that the washpipe is prevented from rotating about the central axis relative to the retainer ring and upper packing nut.

18. The power swivel of claim 17, wherein the connection profile on the washpipe and the connection profile on the retainer ring each comprise a polygonal shape including a plurality of planar surfaces.

19. A power swivel for rotating a tubular string to form a borehole in a subterranean formation, the power swivel comprising:
a gear box including a housing;
a bonnet coupled to the housing;
a motor;
a stem coupled to the motor and the gear box to rotate the stem about a rotational axis, wherein the stem is configured to be coupled to the tubular string;
a washpipe assembly in fluid communication with the stem, wherein the washpipe assembly includes a central axis and comprises:
  a washpipe including an upper end, a lower end opposite the upper end, a radially outermost cylindrical surface disposed between the upper end and the lower end, and a connection profile disposed between the radially outermost cylindrical surface and the upper end;
  a packing nut disposed about the washpipe;
  a lower packing assembly coupled to the stem, wherein the lower packing assembly includes a seal assembly that further includes a plurality of annular seal members, each annular seal member of the plurality including a carrier that is disposed between the packing nut and the washpipe, a seal body comprising an elastomer that is disposed in a recess of the carrier, and a contact insert comprising a polymer that is mounted to the body, wherein the contact insert is sealingly engaged with the radially outermost cylindrical surface of the washpipe; and
  an upper packing assembly coupled to the bonnet, wherein the upper packing assembly includes a connection profile that is mated with the connection profile of the washpipe such that the washpipe is prevented from rotating about the central axis relative to the upper packing assembly.

20. The power swivel of claim 19, wherein the contact insert of each of the annular seal members comprises polytetrafluoroethylene.

21. The power swivel of claim 20, wherein the connection profile on the washpipe and the connection profile on the upper packing assembly each comprise a polygonal shape including a plurality of planar surfaces.

* * * * *